(12) United States Patent
Winkler et al.

(10) Patent No.: US 8,721,925 B2
(45) Date of Patent: May 13, 2014

(54) CO-DOPED SILICOOXYNITRIDES

(75) Inventors: Holger Winkler, Darmstadt (DE); Ralf Petry, Griesheim (DE); Tim Vosgroene, Ober-Ramstadt (DE); Thomas Juestel, Witten (DE); Dominik Uhlich, Steinfurt (DE); Arturas Katelnikavas, Steinfurt (DE)

(73) Assignee: MERCK PATENT GmbH, Darmstadt (DE)

( * ) Notice: Subject to any disclaimer, the term of this patent is extended or adjusted under 35 U.S.C. 154(b) by 192 days.

(21) Appl. No.: 13/383,236

(22) PCT Filed: Jun. 17, 2010

(86) PCT No.: PCT/EP2010/003656
§ 371 (c)(1),
(2), (4) Date: Jan. 10, 2012

(87) PCT Pub. No.: WO2011/006565
PCT Pub. Date: Jan. 20, 2011

(65) Prior Publication Data
US 2012/0140438 A1 Jun. 7, 2012

(30) Foreign Application Priority Data
Jul. 11, 2009 (DE) .......................... 10 2009 032 711

(51) Int. Cl.
*C01B 21/082* (2006.01)
*C09K 11/08* (2006.01)
*C09K 11/02* (2006.01)
*C09K 11/77* (2006.01)

(52) U.S. Cl.
USPC ........ 252/301.4 F; 257/98; 313/503; 313/486

(58) Field of Classification Search
USPC ............... 252/301.4 F; 257/98; 313/503, 486
See application file for complete search history.

(56) References Cited

U.S. PATENT DOCUMENTS

| 7,837,898 | B2 | 11/2010 | Takahara et al. | |
|---|---|---|---|---|
| 2007/0075629 | A1* | 4/2007 | Le Toquin et al. | 313/503 |
| 2008/0054793 | A1* | 3/2008 | Yang et al. | 313/503 |
| 2008/0061271 | A1 | 3/2008 | Takahara et al. | |
| 2010/0061077 | A1 | 3/2010 | Winkler et al. | |
| 2010/0244067 | A1 | 9/2010 | Winkler et al. | |
| 2011/0096560 | A1* | 4/2011 | Ryu et al. | 362/510 |

FOREIGN PATENT DOCUMENTS

EP 1 889 892 A1 2/2008

OTHER PUBLICATIONS

Xie, Rong-Jun, et al., "Silicon-based oxynitride and nitride phosphors for white LEDs—A Review," Science and Technology of Advanced Materials 8 (2007) pp. 588-600, NIMS and Elsevier Ltd.
Toquin, R. Le, et al., "Red-emitting cerium-based phosphor materials for solid-state lighting applications," Chemical Physics Letters 423 (2006) pp. 352-356, Elsevier B.V.
Li, Y.Q., et al., "Luminescence of a new class of UV-blue-emitting phosphors MSi2O2—•N2+⅔ •:Ce3+ (M=Ca, Sr, Ba)," Journal of Materials Chemistry (2005), vol. 15, pp. 4492-4496; The Royal Society of Chemistry.
Uheda, K., et al., "Luminescence Properties of a Red Phosphor, CaAlSiN3:Eu2+ for White Light Emitting Diodes," Electrochemical and Solid-State Letters, 9(4) (2006) pp. H22-H25.
Sohn, Kee-Sun, et al., "Luminescence of Sr2SiO4-xN2x/3:Eu2+ Phosphors Prepared by Spark Plasma Sintering," Journal of the Electrochemical Society (Dec. 12, 2008) 155 (2) pp. J58-J61; Cited in International Search Report, dated Nov. 18, 2010, issued in corresponding PCT/EP2010/003656.
International Search Report, dated Nov. 18, 2010, issued in corresponding PCT/EP2010/003656.

* cited by examiner

*Primary Examiner* — Carol M Koslow
(74) *Attorney, Agent, or Firm* — Millen, White, Zelano & Branigan, P.C.

(57) ABSTRACT

The invention relates to compounds of the formula (I) $(Ca,Sr,Ba)_{6-x}(Si_{1-y}Me_y)_3(O_{1-z}Ma_{2z})_6N_4:Eu_x$ (I), where Me=Th, Ru and/or Os Ma=F and/or Cl, x<0.5, y<1 and z<0.1, and to a process for the preparation of these compounds and use as phosphors and conversion phosphors for the conversion of the blue or near-UV emission from an LED.

27 Claims, 4 Drawing Sheets

CO-DOPED SILICOOXYNITRIDES

The invention relates to compounds which consist of 6-3-6-4 alkaline-earth metal silicooxynitrides which are co-doped with thorium, ruthenium, osmium, fluorine and/or chlorine, to the preparation thereof, and to the use thereof as phosphors and to LED conversion phosphors for warm-white LEDs or so-called colour-on-demand applications.

The colour-on-demand concept is taken to mean the production of light having a certain colour point by means of a pcLED (=phosphor converted LED) using one or more phosphors. This concept is used, for example, in order to produce certain corporate designs, for example for illuminated company logos, trademarks, etc.

In order to achieve high colour spaces by means of LED TV backlighting, deep-red phosphors are necessary, which have an emission maximum in the range 620 nm-660 nm. Suitable material systems which are known to the person skilled in the art are siliconitrides and alumosiliconitride phosphors (Xie, Sci. Technol. Adv. Mater. 2007, 8, 588-600):
1-1-2 nitrides, such as, for example, $CaSiN_2:Eu^{2+}$ (Le Toquin, Cheetham, Chem. Phys. Lett. 2006, 423, 352), 2-5-8 nitrides, such as $(Ca,Sr,Ba)_2Si_5N_8:Eu^{2+}$ (Li et al., Chem. Mater. 2005, 15, 4492), and alumosiliconitrides, such as (Ca, Sr)$AlSiN_3:Eu^{2+}$ (K. Uheda et al., Electrochem. Solid State Lett. 2006, 9, H22).

Nitridic phosphors, as mentioned above, have a series of disadvantages, which result in these materials not being available in large amounts: in particular, the high purity necessary represents a challenge which can only be met with considerable effort in industry. Thus, extremely low concentrations of carbon or oxygen result in the efficiency of the phosphors being reduced sensitively. However, it is virtually impossible to avoid oxygen impurities, since even the starting materials, such as $Si_3N_4$ and the metal nitrides (alkaline-earth metal nitrides, europium nitride), are not available in oxygen-free form. Alternative starting materials, such as metal hydrides, are extremely oxygen- and moisture-sensitive, meaning that oxygen is also introduced into the phosphor via these components. Standard preparation processes, such as carbothermal reduction and nitridation, result in carbon impurities in the phosphor, causing this phosphor to experience greying, which reduces the luminance.

The silicooxynitride $Sr_6Si_3O_6N_4:Eu$ was described for the first time by Sohn et al., Journ. of Electr. Soc. 155(2), J58-J61 (2008).

The object of the present invention is therefore to modify the above-mentioned 6-3-6-4 alkaline-earth metal silicooxynitrides in such a way that these compounds achieve even greater light efficiency.

Surprisingly, it has been found that the requirement for an economically important further increase in the conversion efficiency of the red silicooxy-nitride phosphors $(Ca,Sr,Ba)_6 Si_3O_6N_4:Eu$ can be met if co-doping with thorium, ruthenium, osmium, fluorine and/or chlorine is carried out.

The present invention thus relates to compounds of the 6-3-6-4 alkaline-earth metal silicooxynitride type with europium doping which additionally comprise co-dopants from the series thorium, ruthenium, osmium, fluorine and/or chlorine.

"6-3-6-4 alkaline-earth metal silicooxynitrides" are taken to mean compositions $M_6Si_3O_6N_4:Eu^{2+}$, where M represents an alkaline-earth metal or a mixture of a plurality of alkaline-earth metals.

Preference is given to compounds of the formula I $(Ca,Sr,Ba)_{6-x}(Si_{1-y}Me_y)_3(O_{1-z}Ma_{2z})_6N_4:Eu_x$  (I)

where
Me=Th, Ru and/or Os
Ma=F and/or Cl
x<0.5
y<1 and
z<0.1.

It is preferred for the x value to be equal to 0.003 to 0.2, the y value (which stands for the atom concentration of the co-dopant Me) to be equal to 0.0001 to 0.2, and the z value to be equal to 0.0005 to 0.03.

More preferably, x=0.005 to 0.15 and/or y=0.001 to 0.02.

The greater luminance of the compounds or phosphors of the formula I according to the invention compared with those of identical composition, but without the co-dopants thorium, ruthenium, osmium, fluorine and/or chlorine, can be explained by means of the theories known to the person skilled in the art. This greater luminance is produced by the higher crystal lattice quality through the presence of the halides. The halides very probably cause a reduction in the diffusion barriers which the ions have to overcome in the solid-state reaction in order to be able to occupy the desired lattice sites in the solid structure. The heavy metals Th, Ru or Os very probably cause increased absorption of the phosphor via the so-called heavy-atom effect.

The particle size of the compounds according to the invention is between 50 nm and 30 μm, preferably between 1 μm and 20 μm, more preferably between 2 and 15 μm.

The present invention furthermore relates to a compound obtainable by mixing silicon nitride-, europium- and calcium- and/or strontium- and/or barium-containing starting materials with at least one thorium-, osmium-, ruthenium-, fluoride- and/or chloride-containing co-dopant, which may optionally comprise a fluxing agent from the series of the alkali metal or alkaline-earth metal halides or also a borate compound, by solid-state diffusion methods and subsequent thermal aftertreatment.

The present invention furthermore relates to a process for the preparation of a compound of the 6-3-6-4 alkaline-earth metal silicooxynitride type with europium doping having the following process steps:
  a) mixing at least 4 starting materials selected from silicon nitride-, europium-, calcium-, strontium-, barium-, thorium-, rubidium-, osmium-, fluoride- and/or chloride-containing materials,
  b) subjecting the mixture to thermal aftertreatment to prepare a compound which is an Eu-doped 6-3-6-4 alkaline-earth metal silicooxynitride compound co-doped with thorium-, rubidium-, osmium-, fluoride- and/or chloride, and
  c) washing the thermally aftertreated compounds with an HCl solution and a KOH solution.

The starting materials for the preparation of the compound consist, as mentioned above, of silicon nitride ($Si_3N_4$), calcium hydride and europium fluoride and at least one Th-, Ru-, Os-, F- and Cl-containing co-dopant. Besides the preferred nitrides, hydrides and fluorides, suitable starting materials are also further inorganic and/or organic substances, such as cyanamides, dicyanamides, cyanides, oxalates, malonates, fumarates, carbonates, citrates, ascorbates and acetylacetonates.

The above-mentioned thermal aftertreatment (see process step b) proceeds for a number of hours under reducing conditions, for example with forming gas (for example 90/10), pure hydrogen and/or in an ammonia atmosphere with or without the above-mentioned atmospheres. The temperatures during the thermal aftertreatment (calcination) process are between 1000° C. and 1800° C., preferably 1400° C. to 1600° C., for a number of hours (preferably 8 h).

It is furthermore preferred for the phosphors to be transferred into a high-pressure sintering oven and calcined there at 40 to 70 bar and a temperature of 1400 to 1600° C. for 6 to 10 hours.

It is furthermore preferred for the phosphors to be subjected to hot isostatic pressing in vacuo.

It is additionally preferred for the phosphors to be washed firstly with HCl and subsequently with KOH, which eliminates amorphous $SiO_2$. This washing step advantageously increases the emission intensity and also the absorption of the phosphors.

With the aid of the above-mentioned processes, it is possible to produce any desired outer shapes of the compounds or phosphors according to the invention, such as spherical particles, flakes and structured materials and ceramics. These shapes are summarised in accordance with the invention under the term "shaped bodies". The shaped body is preferably a "phosphor body".

The present invention thus furthermore relates to a shaped body comprising the compounds according to the invention, which has a rough surface which nanoparticles comprising $SiO_2$, $TiO_2$, $Al_2O_3$, ZnO, $ZrO_2$ and/or $Y_2O_3$ or mixed oxides thereof and/or particles comprising the compound according to the invention with or without dopants from the series europium, osmium, ruthenium, thorium, fluorine and/or chlorine.

In a further preferred embodiment, the shaped body has a structured (for example pyramidal) surface on the side opposite an LED chip (see WO 2008/058619, Merck, which is incorporated in its full scope into the context of the present application by way of reference). This enables as much light as possible to be coupled out of the phosphor.

The structured surface on the shaped body is produced by subsequent coating with a suitable material which is already structured, or in a subsequent step by (photo)lithographic processes, etching processes or by writing processes using energy or material beams or the action of mechanical forces.

In a further preferred embodiment, the shaped bodies according to the invention have, on the side opposite an LED chip, a rough surface which carries nanoparticles comprising $SiO_2$, $TiO_2$, $Al_2O_3$, $ZnO_2$, $ZrO_2$ and/or $Y_2O_3$ or combinations of these materials and/or comprising particles having the phosphor composition of the formula I with or without dopants from the series Th, Ru, Os, F and/or Cl. A rough surface here has a roughness of up to a few 100 nm. The coated surface has the advantage that total reflection can be reduced or prevented and the light can be better coupled out of the phosphor according to the invention. (see WO 2008/058619 (Merck), which is incorporated in its full scope into the context of the present application by way of reference)

It is furthermore preferred for the shaped bodies according to the invention to have, on the surface facing away from the chip, a layer of matched refractive index which simplifies the coupling-out of the primary radiation and or the radiation emitted by the phosphor body.

In a further preferred embodiment, the shaped bodies have a continuous surface coating consisting of $SiO_2$, $TiO_2$, $Al_2O_3$, ZnO, $ZrO_2$ and/or $Y_2O_3$ or mixed oxides thereof and/or of the compounds of the formula I without the activator europium. This surface coating has the advantage that a suitable graduation of the refractive indices of the coating materials enables the refractive index to be matched to the environment. In this case, the scattering of the light at the surface of the phosphor is reduced and a greater proportion of the light is able to penetrate into the phosphor and be absorbed and converted there. In addition, the surface coating of matched refractive index enables more light to be coupled out of the phosphor since total internal reflection is reduced.

In addition, a continuous layer is advantageous if the phosphor has to be encapsulated. This may be necessary in order to counter sensitivity of the phosphor or parts thereof to diffusing water or other materials in the immediate environment. A further reason for encapsulation with a closed shell is thermal decoupling of the actual phosphor from the heat generated in the chip. This heat results in a reduction in the fluorescence light yield of the phosphor and may also influence the colour of the fluorescence light. Finally, a coating of this type enables the efficiency of the phosphor to be increased by preventing lattice vibrations arising in the phosphor from propagating to the environment.

In addition, it is preferred for the shaped body to have a porous surface coating consisting of $SiO_2$, $TiO_2$, $Al_2O_3$, ZnO, $ZrO_2$ and/or $Y_2O_3$ or mixed oxides thereof and/or of the compounds of the formulae I with or without dopants from the series Eu, Th, Ru, Os, F and/or Cl. These porous coatings offer the possibility of further reducing the refractive index of a single layer. Porous coatings of this type can be produced by three conventional methods, as described in WO 03/027015, which is incorporated in its full scope into the context of the present application by way of reference: the etching of glass (for example soda-lime glasses (see U.S. Pat. No. 4,019,884)), the application of a porous layer, and the combination of a porous layer and an etching operation.

In a further preferred embodiment, the shaped body has a surface which carries functional groups which facilitate chemical bonding or physical binding to the environment, preferably consisting of epoxy or silicone resin. These functional groups can be, for example, esters or other derivatives which are bonded via oxo groups and are able to form links to constituents of the binders based on epoxides and/or silicones. Surfaces of this type have the advantage that homogeneous incorporation of the phosphors into the binder is facilitated. Furthermore, the rheological properties of the phosphor/binder system and also the pot lives can thereby be adjusted to a certain extent. Processing of the mixtures is thus simplified. The term physical binding to the environment is used in this connection if electro-static interactions act between the systems via charge fluctuations or partial charges.

Since the phosphor layer according to the invention applied to the LED chip preferably consists of a mixture of silicone and homogeneous phosphor particles, and the silicone has a surface tension, this phosphor layer is not uniform on a microscopic level or the thickness of the layer is not constant throughout.

The preparation of flake-form phosphors as a further preferred embodiment is carried out by conventional processes from the corresponding metal salts and/or rare-earth salts. The preparation process is described in detail in EP 763573 and WO 2008/058620, which are incorporated into the context of the present application in their full scope by way of reference. These flake-form phosphors can be prepared by coating a natural or synthetically prepared, highly stable support or a substrate comprising, for example, mica, $SiO_2$, $Al_2O_3$, $ZrO_2$, glass or $TiO_2$ flakes which has a very large aspect ratio, an atomically smooth surface and an adjustable thickness with a phosphor layer by a precipitation reaction in aqueous dispersion or suspension. Besides mica, $ZrO_2$, $SiO_2$, $Al_2O_3$, glass or $TiO_2$ or mixtures thereof, the flakes may also consist of the phosphor material itself or be built up from one material. If the flake itself merely serves as support for the phosphor coating, the latter must consist of a material which is transparent to the primary radiation of the LED, or absorbs the primary radiation and transfers this energy to the phosphor layer. The flake-form phosphors are dispersed in a resin (for example silicone or epoxy resin), and this dispersion is applied to the LED chip.

The flake-form phosphors can be prepared on a large industrial scale in thicknesses of 50 nm to about 20 μm, preferably between 150 nm and 5 μm. The diameter here is from 50 nm to 20 μm. It generally has an aspect ratio (ratio of the diameter to the particle thickness) of 1:1 to 400:1 and in particular 3:1 to 100:1. The flake dimensions (length×width) are dependent on the arrangement. Flakes are also suitable as centres of scattering within the conversion layer, in particular if they have particularly small dimensions.

The surface of the flake-form phosphor according to the invention facing the LED chip can be provided with a coating which has an antireflection action with respect to the primary radiation emitted by the LED chip. This results in a reduction in back-scattering of the primary radiation, enabling the latter to be coupled better into the phosphor body according to the invention.

Suitable for this purpose are, for example, coatings of matched refractive index, which must have a following thickness d: d=[wavelength of the primary radiation of the LED chip/(4*refractive index of the phosphor ceramic)], see, for example, Gerthsen, Physik [Physics], Springer Verlag, 18th Edition, 1995. This coating may also consist of photonic crystals. Which also includes structuring of the surface of the flake-form phosphor in order to achieve certain functionalities.

The shaped bodies according to the invention in the form of ceramic bodies are produced analogously to the process described in WO 2008/017353 (Merck), which is incorporated in its full scope into the context of the present application by way of reference. In this process, the phosphor is prepared by mixing the corresponding starting materials and dopants, subsequently subjected to isostatic pressing and applied directly to the surface of the chip in the form of a homogeneous thin and non-porous flake or at a distance from the chip (remote phosphor concept). The respective arrangement depends, inter alia, on the architecture of the LED device, where the person skilled in the art is able to select the advantageous arrangement.

There is thus no location-dependent variation of the excitation and emission of the phosphor, which means that the LED provided therewith emits a homogeneous light cone of constant colour and has high light output. The ceramic phosphor bodies can be produced on a large industrial scale, for example, as flakes in thicknesses from a few 100 nm to about 500 μm. The flake dimensions (length×width) are dependent on the arrangement. In the case of direct application to the chip, the size of the flake should be selected in accordance with the chip dimensions (from about 100 μm* 100 μm to several mm$^2$) with a certain oversize of about 10% to 30% of the chip surface with a suitable chip arrangement (for example flip-chip arrangement) or correspondingly. If the phosphor flake is installed over a finished LED, all of the exiting light cone passes through the flake.

The side surfaces of the ceramic phosphor body can be coated with a light metal or noble metal, preferably aluminium or silver. The metal coating has the effect that light does not exit laterally from the phosphor body. Light exiting laterally can reduce the light current to be coupled out of the LED. The metal coating of the ceramic phosphor body is carried out in a process step after the isostatic pressing to give rods or flakes, where a cutter of the rods or flakes to the requisite size can optionally be carried out before the metal coating. To this end, the side surfaces are wetted, for example, with a solution comprising silver nitrate and glucose and subsequently exposed to an ammonia atmosphere at elevated temperature. A silver coating, for example, forms on the side surfaces in the process.

Alternatively, currentless metallisation processes are also suitable, see, for example, Hollemann-Wiberg, Lehrbuch der Anorganischen Chemie [Text-book of Inorganic Chemistry], Walter de Gruyter Verlag or Ullmanns Enzyklopädie der chemischen Technologie [Ullmann's Encyclopaedia of Chemical Technology].

The ceramic phosphor body can, if necessary, be fixed to the baseboard of an LED chip using a water-glass solution.

In a further embodiment, the ceramic phosphor body has, on the side opposite an LED chip, a structured (for example pyramidal) surface. This enables as much light as possible to be coupled out of the phosphor body. The structured surface on the phosphor body is produced by carrying out the isostatic pressing using a compression mould having a structured pressure plate and thus embossing a structure into the surface. Structured surfaces are desired if the aim 1s to produce the thinnest possible phosphor bodies or flakes. The pressing conditions are known to the person skilled in the art (see J. Kriegsmann, Technische keramische Werkstoffe [Technical Ceramic Materials], Chapter 4, Deutscher Wirtschaftsdienst, 1998). It is important that the pressing temperatures used are ⅔ to ⅚ of the melting point of the substance to be pressed.

The present invention furthermore relates to a process for the production of a shaped body, preferably a phosphor body, having the following process steps:
  a) mixing at least 4 starting materials selected from silicon nitride-, europium-, calcium-, strontium-, barium-, ruthenium-, thorium-, osmium, fluoride- and/or chloride-containing materials,
  b) subjecting the mixture to thermal aftertreatment to prepare a compound which is a europium-doped 6-3-6-4 alkaline-earth metal silicooxy-nitride compound co-doped with thorium-, rubidium, osmium, fluoride and/or chloride-,
  c) forming a shaped body having a rough surface, and
  d) coating of the surface of the shaped body with nanoparticles comprising $SiO_2$, $TiO_2$, $Al_2O_3$, ZnO, $ZrO_2$ and/or $Y_2O_3$ or mixed oxides thereof or with nanoparticles comprising the compounds according to the invention.

According to a further aspect of the process, the process step b) is followed by a washing step with an HCl solution and a KOH solution.

In addition, the excitability of the phosphors according to the invention extends over a broad range, which extends from about 350 nm to 530 nm, preferably 430 nm to about 500 nm. These phosphors are thus suitable not only for excitation by UV- or blue-emitting primary light sources, such as LEDs or conventional discharge lamps (for example based on Hg), but also for light sources as such which utilise the blue $In^{3+}$ line at 451 nm.

The present invention furthermore relates to a lighting unit having at least one primary light source whose emission maximum or maxima extends in the range 250 nm to 530 nm, preferably 350 nm to about 500 nm. A range between 440 and 480 nm is particularly preferred, with the primary radiation being partially or fully converted into longer-wavelength radiation by the compounds or phosphors according to the invention. This lighting unit is preferably white-emitting or emits light having a certain colour point (colour-on-demand principle). Preferred embodiments of the lighting units according to the invention are depicted in FIGS. 1 to 7.

In a preferred embodiment of the lighting unit according to the invention, the light source is a luminescent indium aluminium gallium nitride, in particular of the formula $In_iGa_jAl_kN$, where $0 \leq i$, $0 \leq j$, $0 \leq k$, and $1+j+k=1$. Possible forms of light sources of this type are known to the person skilled in the art. These can be light-emitting LED chips of various structure.

In a further preferred embodiment of the lighting unit according to the invention, the light source is a luminescent arrangement based on ZnO, TCO (transparent conducting oxide), ZnSe or SiC or also an arrangement based on an organic light-emitting layer (OLED).

In a further preferred embodiment of the lighting unit according to the invention, the light source is a source which exhibits electroluminescence and/or photoluminescence. The light source may furthermore also be a plasma or discharge source (e.g., plasma or discharge lamp).

The phosphors according to the invention can either be dispersed in a resin (for example epoxy or silicone resin) or, given suitable size ratios, arranged directly on the primary light source or alternatively arranged remote therefrom, depending on the application (the latter arrangement also encompasses "remote phosphor technology"). The advantages of remote phosphor technology are known to the person skilled in the art and are revealed, for example, by the following publication: Japanese Journ. of Appl. Phys. Vol. 44, No. 21 (2005). L649-L651.

In a further embodiment, it is preferred for the optical coupling of the lighting unit between the phosphor and the primary light source to be achieved by a light-conducting arrangement. It is thus possible for the primary light source to be installed at a central location and to be optically coupled to the phosphor by means of light-conducting devices, such as, for example, optical fibres. In this way, it is possible to achieve lights adapted to the lighting wishes which merely consist of one or various phosphors, which can be arranged to form a light screen, and an optical waveguide, which is coupled to the primary light source. In this way, it is possible to place a strong primary light source at a location which is favourable for electrical installation and to install lights comprising phosphors which are coupled to the optical waveguides at any desired locations without further electrical cabling, but instead only by laying optical waveguides.

The present invention furthermore relates to the use of the compounds and shaped bodies according to the invention as phosphors or phosphor bodies.

The present invention furthermore relates to the use of the compounds according to the invention for the partial or complete conversion of the blue or near-UV emission from a luminescent diode.

Preference is furthermore given to the use of the compounds according to the invention for conversion of the blue or near-UV emission into visible white radiation. Preference is furthermore given to the use of the compounds according to the invention for conversion of the primary radiation into a certain colour point in accordance with the "colour-on-demand" concept.

The compounds of the formula I according to the invention can be employed individually or as a mixture with the following phosphors which are familiar to the person skilled in the art:

$Ba_2SiO_4:Eu^{2+}$, $BaSi_2O_6:Pb^{2+}$, $Ba_xSr_{1-x}F_2:Eu^{2+}$, $BaSrMgSi_2O_7:Eu^{2+}$, $BaTiP_2O_7$, $(Ba,Ti)_2P_2O_7:Ti$, $Ba_3WO_6:U$, $BaY_2F_8:Er^{3+}$, $Yb^+$, $Be_2SiO_4:Mn^{2+}$, $Bi_4Ge_3Oi_2$, $CaAl_2O_4:Ce^{3+}$, $CaLa_4O_7:Ce^{3+}$, $CaAl_2O_4:Eu^{2+}$, $CaAl_2O_4:Mn^{2+}$, $CaAl_4O_7:Pb^{2+}$, $Mn^{2+}$, $CaAl_2O_4:Tb^{3+}$, $Ca_3Al_2Si_3O_{12}:Ce^{3+}$, $Ca_3Al_2Si_3Oi_2:Ce^{3+}$, $Ca_3Al_2Si_3O_2:Eu^{2+}$, $Ca_2B_5O_9Br:Eu^{2+}$, $Ca_2B_5O_9Cl:Eu^{2+}$, $Ca_2B_5O_9Cl:Pb^{2+}$, $CaB_2O_4:Mn^{2+}$, $Ca_2B_2O_5:Mn^{2+}$, $CaB_2O_4:Pb^{2+}$, $CaB_2P_2O_6:Eu^{2+}$, $Ca_6B_2SiO_{10}:Eu^{3+}$, $Ca_{0.6}Ba_{0.5}Al_{12}O_{19}:Ce^{3+}$, $Mn^{2+}$, $Ca_2Ba_3(PO4)_3Cl:Eu^{2+}$, $CaBr_2:Eu^{2+}$ in $SiO_2$, $CaCl_2:Eu^{2+}$ in $SiO_2$, $CaCl_2:Eu^{2+}$, $Mn^{2+}$ in $SiO_2$, $CaF_2:Ce^{3+}$, $CaF_2:Ce^{3+}$, $Mn^{2+}$, $CaF_2:Ce^{3+}$, $Tb^{3+}$, $CaF_2:Eu^{2+}$, $CaF_2:Mn^{2+}$, $CaF_2:U$, $CaGa_2O_4:Mn^{2+}$, $CaGa_4O_7:Mn^{2+}$, $CaGa_2S_4:Ce^{3+}$, $CaGa_2S_4:Eu^{2+}$, $CaGa_2S_4:Mn^{2+}$, $CaGa_2S_4:Pb^{2+}$, $CaGeO_3:Mn^{2+}$, $CaI_2:Eu^{2+}$ in $SiO_2$, $CaI_2:Eu^{2+}$, $Mn^{2+}$ in $SiO_2$, $CaLaBO_4:Eu^{3+}$, $CaLaB_3O_7:Ce^{3+}$, $Mn^{2+}$, $Ca_2La_2BO_{6.5}:Pb^{2+}$, $Ca_2MgSi_2O_7$, $Ca_2MgSi_2O_7:Ce^{3+}$, $CaMgSi_2O_6:Eu^{2+}$, $Ca_3MgSi_2O_8:Eu^{2+}$, $Ca_3MgSi_2O_7:Eu^{2+}$, $CaMgSi_2O_6:Eu^{2+}$, $Mn^{2+}$, $Ca_3MgSi_2O_7:Eu^{2+}$, $Mn^{2+}$, $CaMoO_4$, $CaMoO_4:Eu^{3+}$, $CaO:Bi^{3+}$, $CaO:Cd^{2+}$, $CaO:Cu^+$, $CaO:Eu^{3+}$, $CaO:Eu^{3+}$, $Na^+$, $CaO:Mn^{2+}$, $CaO:Pb^{2+}$, $CaO:Sb^{3+}$, $CaO:Sm^{3+}$, $CaO:Tb^{3+}$, $CaO:Tl$, $CaO:Zn^{2+}$, $Ca_2P_2O_7:Ce^{3+}$, $\alpha$-$Ca_3(PO_4)_2:Ce^{3+}$, $\beta$-$Ca_3(PO_4)_2:Ce^{3+}$, $Ca_6(PO_4)_3Cl:Eu^{2+}$, $Ca_6(PO_4)_3Cl:Mn^{2+}$, $Ca_6(PO_4)_3Cl:Sb^{3+}$, $Ca_6(PO_4)_3Cl:Sn^{2+}$, $\beta$-$Ca_3(PO_4)_2:Eu^{2+}$, $Mn^{2+}$, $Ca_6(PO_4)_3F:Mn^{2+}$, $Ca_s(PO_4)_3F:Sb^{3+}$, $Ca_s(PO_4)_3F:Sn^{2+}$, $\alpha$-$Ca_3(PO_4)_2:Eu^{2+}$, $\beta$-$Ca_3(PO_4)_2:Eu^{2+}$, $Ca_2P_2O_7:Eu^{2+}$, $Ca_2P_2O_7:Eu^{2+}$, $Mn^{2+}$, $CaP_2O_6:Mn^{2+}$, $\alpha$-$Ca_3(PO_4)_2:Pb^{2+}$, $\alpha$-$Ca_3(PO_4)_2:Sn^{2+}$, $\beta$-$Ca_3(PO_4)_2:Sn^{2+}$, $\beta$-$Ca_2P_2O_7:Sn$, $Mn$, $\alpha$-$Ca_3(PO_4)_2:Tr$, $CaS:Bi^{3+}$, $CaS:Bi^{3+}$, $Na$, $CaS:Ce^{3+}$, $CaS:Eu^{2+}$, $CaS:Cu^+$, $Na^+$, $CaS:La^{3+}$, $CaS:Mn^{2+}$, $CaSO_4:Bi$, $CaSO_4:Ce^{3+}$, $CaSO_4:Ce^{3+}$, $Mn^{2+}$, $CaSO_4:Eu^{2+}$, $CaSO_4:Eu^{2+}$, $Mn^{2+}$, $CaSO_4:Pb^{2+}$, $CaS:Pb^{2+}$, $CaS:Pb^{2+}$, $Cl$, $CaS:Pb^{2+}$, $Mn^{2+}$, $CaS:Pr^{3+}$, $Pb^{2+}$, $Cl$, $CaS:Sb^{3+}$, $CaS:Sb^{3+}$, $Na$, $CaS:Sm^{3+}$, $CaS:Sn^{2+}$, $CaS:Sn^{2+}$, $F$, $CaS:Tb^{3+}$, $CaS:Tb^{3+}$, $Cl$, $CaS:Y^{3+}$, $CaS:Yb^{2+}$, $CaS:Yb^{2+}$, $Cl$, $CaSiO_3:Ce^{3+}$, $Ca_3SiO_4Cl_2:Eu^{2+}$, $Ca_3SiO_4Cl_2:Pb^{2+}$, $CaSiO_3:Eu^{2+}$, $CaSiO_3:Mn^{2+}$, $Pb$, $CaSiO_3:Pb^{2+}$, $CaSiO_3:Pb^{2+}$, $Mn^{2+}$, $CaSiO_3:Ti^{4+}$, $CaSr_2(PO_4)_2:Bi^{3+}$, $\beta$-$(Ca,Sr)_3(PO_4)_2:Sn^{2+}Mn^{2+}$, $CaTi_{0.6}Al_{0.1}O_3:Bi^{3+}$, $CaTiO_3:Eu^{3+}$, $CaTiO_3Pr^{3+}$, $Ca_5(VO_4)_3Cl$, $CaWO_4$, $CaWO_4:Pb^{2+}$, $CaWO_4:W$, $Ca_3WO_6:U$, $CaYAlO_4:Eu^{3+}$, $CaYBO_4:Bi^{3+}$, $CaYBO_4:Eu^{3+}$, $CaYB_{0.8}O_{3.7}:Eu^{3+}$, $CaY_2ZrO_6:Eu^{3+}$, $(Ca,Zn,Mg)_3(PO_4)_2:Sn$, $CeF_3$, $(Ce,Mg)BaAl_{11}O_{18}:Ce$, $(Ce,Mg)SrAl_{11}O_{18}:Ce$, $CeMgAl_{11}O_{16}:Ce:Tb$, $Cd_2B_6O_{11}:Mn^{2+}$, $CdS:Ag^+$, $Cr$, $CdS:In$, $CdS:In$, $CdS:In$, $Te$, $CdS:Te$, $CdWO_4$, $CsF$, $CsI$, $CsI:Na^+$, $CsI:Tl$, $(ErCl_3)_{0.25}(BaCl_2)_{0.75}$, $GaN:Zn$, $Gd_3Ga_6O_{12}:Cr^{3+}$, $Gd_3Ga_5O_{12}:Cr$, $Ce$, $GdNbO_4:Bi^{3+}$, $Gd_2O_2S:Eu^{3+}$, $Gd_2O_2Pr^{3+}$, $Gd_2O_2S:Pr$, $Ce$, $F$, $Gd_2O_2S:Tb^{3+}$, $Gd_2SiO_6:Ce^{3+}$, $KAl_{11}O_{17}:Tl^+$, $KGa_{11}O_{17}:Mn^{2+}$, $K_2La_2Ti_3O_{10}:Eu$, $KMgF_3:Eu^{2+}$, $KMgF_3:Mn^{2+}$, $K_2SiF_6:Mn^{4+}$, $LaAl_3B_4O_{12}:Eu^{3+}$, $LaAlB_2O_6:Eu^{3+}$, $LaAlO_3:Eu^{3+}$, $LaAlO_3:Sm^{3+}$, $LaAsO_4:Eu^{3+}$, $LaBr_3:Ce^{3+}$, $LaBO_3:Eu^{3+}$, $(La,Ce,Tb)PO_4:Ce:Tb$, $LaCl_3:Ce^{3+}$, $La_2O_3:Bi^{3+}$, $LaOBr:Tb^{3+}$, $LaOBr:Tm^{3+}$, $LaOCl:Bi^{3+}$, $LaOCl:Eu^{3+}$, $LaOF:Eu^{3+}$, $La_2O_3:Eu^{3+}$, $La_2O_3:Pr^{3+}$, $La_2O_2S:Tb^{3+}$, $LaPO_4:Ce^{3+}$, $LaPO_4:Eu^{3+}$, $LaSiO_3Cl:Ce^{3+}$, $LaSiO_3Cl:Ce^{3+}$, $Tb^{3+}$, $LaVO_4:Eu^{3+}$, $La_2W_3O_{12}:Eu^{3+}$, $LiAlF_4:Mn^{2+}$, $LiAl_6O_8:Fe^{3+}$, $LiAlO_2:Fe^{3+}$, $LiAlO_2:Mn^{2+}$, $LiAl_6O_8:Mn^{2+}$, $Li_2CaP_2O_7:Ce^{3+}$, $Mn^{2+}$, $LiCeBa_4Si_4O_{14}:Mn^{2+}$, $LiCeSrBa_3Si_4O_{14}:Mn^{2+}$, $LiInO_2:Eu^{3+}$, $LiInO_2:Sm^{3+}$, $LiLaO_2:Eu^{3+}$, $LuAlO_3:Ce^{3+}$, $(Lu,Gd)_2SiO_6:Ce^{3+}$, $Lu_2SiO_6:Ce^{3+}$, $Lu_2Si_2O_7:Ce^{3+}$, $LuTaO_4:Nb^{5+}$, $Lu_{1-x}Y_xAlO_3:Ce^{3+}$, $MgAl_2O_4:Mn^{2+}$, $MgSrAl_{10}O_{17}:Ce$, $MgB_2O_4:Mn^{2+}$, $MgBa_2(PO_4)_2:Sn^{2+}$, $MgBa_2(PO_4)_2:U$, $MgBaP_2O_7:Eu^{2+}$, $MgBaP_2O_7:Eu^{2+}$, $Mn^{2+}$, $MgBa_3Si_2O_8:Eu^{2+}$, $MgBa(SO_4)_2:Eu^{2+}$, $Mg_3Ca_3(PO_4)_4:Eu^{2+}$, $MgCaP_2O_7:Mn^{2+}$, $Mg_2Ca(SO_4)_3:Eu^{2+}$, $Mg_2Ca(SO_4)_3:Eu^{2+}$, $Mn^2$, $MgCeAl_nO_{19}:Tb^{3+}$, $Mg_4(F)GeO_6:Mn^{2+}$, $Mg_4(F)(Ge,Sn)O_6:Mn^{2+}$, $MgF_2:Mn^{2+}$, $MgGa_2O_4:Mn^{2+}$, $Mg_8Ge_2O_{11}F_2:Mn^{4+}$, $MgS:Eu^{2+}$, $MgSiO_3:Mn^{2+}$, $Mg_2SiO_4:Mn^{2+}$, $Mg_3SiO_3F_4:Ti^{4+}$, $MgSO_4:Eu^{2+}$, $MgSO_4:Pb^{2+}$, $MgSrBa_2Si_2O_7:Eu^{2+}$, $MgSrP_2O_7:Eu^{2+}$, $MgSr_6$ $(PO_4)_4:Sn^{2+}$, $MgSr_3Si_2O_8:Eu^{2+}$, $Mn^{2+}$, $Mg_2Sr(SO_4)_3$: $Eu^{2+}$, $Mg_2TiO_4:Mn^{4+}$, $MgWO_4$, $MgYBO_4:Eu^{3+}$, $Na_3Ce(PO_4)_2:Tb^{3+}$, $NaI:Tl$, $Na_{1.23}K_{0.42}Eu_{0.12}TiSi_4O_{11}:Eu^{3+}$, $Na_{1.23}K_{0.42}Eu_{0.12}TiSi_5O_{13} \cdot xH_2O:Eu^{3+}$, $Na_{1.29}K_{0.46}Er_{0.08}TiSi_4O_{11}:Eu^{3+}$, $Na_2Mg_3Al_2Si_2O_{10}:Tb$, $Na(Mg_{2-x}Mn_x)LiSi_4O_{10}F_2:Mn$, $NaYF_4:Er^{3+}$, $Yb^{3+}$, $NaYO_2:Eu^{3+}$, P46(70%)+P47 (30%), $SrAl_{12}O_{16}:Ce^{3+}$, $Mn^{2+}$, $SrAl_2O_4:Eu^{2+}$, $SrAl_4O_7:Eu^{3+}$, $SrAl_{12}O_{19}:Eu^{2+}$, $SrAl_2S_4:Eu^{2+}$, $Sr_2B_6O_9Cl:Eu^{2+}$, $SrB_4O_7:Eu^{2+}(F,Cl,Br)$, $SrB_4O_7:Pb^{2+}$, $SrB_4O_7:Pb^{2+}$, $Mn^{2+}$, $SrB_8O_{13}:Sm^{2+}$, $Sr_xBa_yCl_zAl_2O_{4-z/2}:Mn^{2+}$, $SrBaSiO_4:Eu^{2+}$, $Sr(Cl,Br,I)_2:Eu^{2+}$ in $SiO_2$, $SrCl_2:Eu^{2+}$ in $SiO_2$, $Sr_5Cl(PO_4)_3:Eu$, $Sr_wF_x(B_4O_{6.5}):Eu^{2+}$, $Sr_wF_xB_yO_z:Eu^{2+}$, $Sm^{2+}$, $SrF_2:Eu^{2+}$, $SrGa_{12}O_{19}:Mn^{2+}$, $SrGa_2S_4:Ce^{3+}$, $SrGa_2S_4:Eu^{2+}$, $SrGa_2S_4:Pb^{2+}$, $SrIn_2O_4:Pr^{3+}$, $Al^{3+}$, $(Sr,Mg)_3(PO_4)_2:Sn$, $SrMgSi_2O_6:Eu^{2+}$, $Sr_2MgSi_2O_7:Eu^{2+}$, $Sr_3MgSi_2O_8:Eu^{2+}$, $SrMoO_4:U$, $SrO \cdot 3B_2O_3:Eu^{2+}$, Cl, $\beta\text{-}SrO \cdot 3B_2O_3:Pb^{2+}$, $\beta\text{-}SrO \cdot 3B_2O_3:Pb^{2+}$, $Mn^{2+}$, $\alpha\text{-}SrO \cdot 3B_2O_3:Sm^{2+}$, $Sr_6P_5BO_{20}:Eu$, $Sr_6(PO_4)_3Cl:Eu^{2+}$, $Sr_6(PO_4)_3Cl:Eu^{2+}$, $Pr^{3+}$, $Sr_6(PO_4)_3Cl:Mn^{2+}$, $Sr_6(PO_4)_3Cl:Sb^{3+}$, $Sr_2P_2O_7:Eu^{2+}$, $\beta\text{-}Sr_3(PO_4)_2:Eu^{2+}$, $Sr_6(PO_4)_3F:Mn^{2+}$, $Sr_6(PO_4)_3F:Sb^{3+}$, $Sr_6(PO_4)_3F:Sb^{3+}$, $Mn^{2+}$, $Sr_6(PO_4)_3F:Sn^{2+}$, $Sr_2P_2O_7:Sn^{2+}$, $\beta\text{-}Sr_3(PO_4)_2:Sn^{2+}$, $\beta\text{-}Sr_3(PO_4)_2:Sn^{2+}$, $Mn^{2+}(Al)$, $SrS:Ce^{3+}$, $SrS:Eu^{2+}$, $SrS:Mn^{2+}$, $SrS:Cu^+$, Na, $SrSO_4:Bi$, $SrSO_4:Ce^{3+}$, $SrSO_4:Eu^{2+}$, $SrSO_4:Eu^{2+}$, $Mn^{2+}$, $Sr_5Si_4O_{10}Cl_6:Eu^{2+}$, $Sr_2SiO_4:Eu^{2+}$, $SrTiO_3:Pr^{3+}$, $SrTiO_3:Pr^{3+}$, $Al^{3+}$, $Sr_3WO_6:U$, $SrY_2O_3:Eu^{3+}$, $ThO_2:Eu^{3+}$, $ThO_2:Pr^{3+}$, $ThO_2:Tb^{3+}$, $YAl_3B_4O_{12}:Bi^{3+}$, $YAl_3B_4O_{12}:Ce^{3+}$, $YAl_3B_4O_{12}:Ce^{3+}$, Mn, $YAl_3B_4O_{12}:Ce^{3+}$, $Tb^{3+}$, $YAl_3B_4O_{12}:Eu^{3+}$, $YAl_3B_4O_{12}:Eu^{3+}$, $Cr^{3+}$, $YAl_3B_4O_{12}:Th^{4+}$, $Ce^{3+}$, $Mn^{2+}$, $YAlO_3:Ce^{3+}$, $Y_3Al_6O_{12}:Ce^{3+}$, $Y_3Al_6O_{12}:Cr^{3+}$, $YAlO_3:Eu^{3+}$, $Y_3Al_5O_{12}:Eu^{3+}$, $Y_4Al_2O_9:Eu^{3+}$, $Y_3Al_6O_{12}:Mn^{4+}$, $YAlO_3:Sm^{3+}$, $YAlO_3:Tb^{3+}$, $Y_3Al_6O_{12}:Tb^{3+}$, $YAsO_4:Eu^{3+}$, $YBO_3:Ce^{3+}$, $YBO_3:Eu^{3+}$, $YF_3:Er^{3+}$, $Yb^{3+}$, $YF_3:Mn^{2+}$, $YF_3:Mn^{2+}$, $Th^{4+}$, $YF_3:Tm^{3+}$, $Yb^{3+}$, $(Y,Gd)BO_3:Eu$, $(Y,Gd)BO_3:Tb$, $(Y,Gd)_2O_3:Eu^{3+}$, $Y_{1.34}Gd_{0.60}O_3(Eu,Pr)$, $Y_2O_3:Bi^{3+}$, $YOBrEu^{3+}$, $Y_2O_3:Ce$, $Y_2O_3:Er^{3+}$, $Y_2O_3:Eu^{3+}(YOE)$, $Y_2O_3:Ce^{3+}$, $Tb^{3+}$, $YOCl:Ce^{3+}$, $YOCl:Eu^{3+}$, $YOF:Eu^{3+}$, $YOF:Tb^{3+}$, $Y_2O_3:Ho^{3+}$, $Y_2O_2S:Eu^{3+}$, $Y_2O_2S:Pr^{3+}$, $Y_2O_2S:Tb^{3+}$, $Y_2O_3:Tb^{3+}$, $YPO_4:Ce^{3+}$, $YPO_4:Ce^{3+}$, $Tb^{3+}$, $YPO_4:Eu^{3+}$, $YPO_4:Mn^{2+}$, $Th^{4+}$, $YPO_4:V^{5+}$, $Y(P,V)O_4:Eu$, $Y_2SiO_5:Ce^{3+}$, $YTaO_4$, $YTaO_4:Nb^{5+}$, $YVO_4:Dy^{3+}$, $YVO_4:Eu^{3+}$, $ZnAl_2O_4:Mn^{2+}$, $ZnB_2O_4:Mn^{2+}$, $ZnBa_2S_3:Mn^{2+}$, $(Zn,Be)_2SiO_4:Mn^{2+}$, $Zn_{0.4}Cd_{0.6}S:Ag$, $Zn_{0.6}Cd_{0.4}S:Ag$, $(Zn, Cd)S:Ag$, Cl, $(Zn, Cd)S:Cu$, $ZnF_2:Mn^{2+}$, $ZnGa_2O_4$, $ZnGa_2O_4:Mn^{2+}$, $ZnGa_2S_4:Mn^{2+}$, $Zn_2GeO_4:Mn^{2+}$, $(Zn,Mg)F_2:Mn^{2+}$, $ZnMg_2(PO_4)_2:Mn^{2+}$, $(Zn,Mg)_3(PO_4)_2:Mn^{2+}$, $ZnO:Al^{3+}$, $Ga^{3+}$, $ZnO:Bi^{3+}$, $ZnO:Ga^{3+}$, $ZnO:Ga$, $ZnO\text{—}CdO:Ga$, $ZnO:S$, $ZnO:Se$, $ZnO:Zn$, $ZnS:Ag$, Cu, Cl, $ZnS:Ag$, Ni, $ZnS:Au$, In, $ZnS\text{—}CdS$ (25-75), $ZnS\text{—}CdS$ (50-50), $ZnS\text{—}CdS$ (75-25), $ZnS\text{—}CdS:Ag$, Br, Ni, $ZnS\text{—}CdS:Ag^+$, Cl, $ZnS\text{—}CdS:Cu$, Br, $ZnS\text{—}CdS:Cu$, I, $ZnS:Cl^-$, $ZnS:Eu^{2+}$, $ZnS:Cu$, $ZnS:Cu^+$, $Al^{3+}$, $ZnS:Cu^+$, $Cl^-$, $ZnS:Cu$, Sn, $ZnS:Eu^{2+}$, $ZnS:Mn^{2+}$, $ZnS:Mn$, Cu, $ZnS:Mn^{2+}$, $Te^{2+}$, $ZnS:P$, $ZnS:P^{3-}$, $Cl^-$, $ZnS:Pb^{2+}$, $ZnS:Pb^{2+}$, $Cl^-$, $ZnS:Pb$, Cu, $Zn_3(PO_4)_2:Mn^{2+}$, $Zn_2SiO_4:Mn^{2+}$, $Zn_2SiO_4:Mn^{2+}$, $As^{5+}$, $Zn_2SiO_4:Mn$, $Sb_2O_2$, $Zn_2SiO_4:Mn^{2+}$, P, $Zn_2SiO_4:Ti^{4+}$, $ZnS:Sn^{2+}$, $ZnS:Sn$, Ag, $ZnS:Sn^{2+}$, $Li^+$, $ZnS:Te$, Mn, $ZnS\text{—}ZnTe:Mn^{2+}$, $ZnSe:Cu^+$, Cl, $ZnWO_4$ The following examples are intended to illustrate the present invention. However, they should in no way be regarded as limiting. All compounds or components which can be used in the compositions are either known and commercially available or can be synthesised by known methods. The temperatures indicated in the examples are always in ° C. It furthermore goes without saying that, both in the description and also in the examples, the added amounts of the components in the compositions always add up to a total of 100%. Percentage data given should always be regarded in the given connection. However, they usually always relate to the weight of the part-amount or total amount indicated.

EXAMPLES

Example 1

Preparation of 5 g of $Sr_{5.94}Eu_{0.06}Si_3O_6N_4$ 6.8112 g of $SrC_2O_4$ (Alfa Aesar, 95%), 0.0689 g of $Eu_2O_3$ (Treibacher, 99.99%) and 0.9159 g of $\alpha\text{-}Si_3N_4$ (UBE, 99%) are thoroughly combined with one another in an agate mortar in a glovebox filled with dry $N_2$. The crude substance mixture obtained in this way is transferred into an $Al_2O_3$ boat lined with Mo foil. The mixture is heated at 1200-1600° C. for 8 hours under an $N_2/H_2/NH_3$ atmosphere

Example 2

Preparation of 5 g of $Sr_{5.94}Eu_{0.06}Si_3O_{5.88}N_4F_{0.24}$ 6.6736 g of $SrC_2O_4$ (Alfa Aesar, 95%), 0.0689 g of $Eu_2O_3$ (Treibacher, 99.99%), 0.0984 g of $SrF_2$ (Aldrich, 99.998%) and 0.9159 g of $\alpha\text{-}Si_3N_4$ (UBE, 99%) are thoroughly combined with one another in an agate mortar in a glovebox filled with dry $N_2$. The crude substance mixture obtained in this way is transferred into an $Al_2O_3$ boat lined with Mo foil. The mixture is heated at 1200-1600° C. for 8 hours under an $N_2/H_2/NH_3$ atmosphere.

Example 3

Preparation of 5 g of $Sr_{5.94}Eu_{0.06}Si_3O_{5.88}N_4Cl_{0.24}$ 6.6168 g of $SrC_2O_4$ (Alfa Aesar, 95%), 0.0683 g of $Eu_2O_3$ (Treibacher, 99.99%), 0.1231 g of $SrCl_2$ (Alfa Aesar, 99.5%) and 0.9081 g of $\alpha\text{-}Si_3N_4$ (UBE, 99%) are thoroughly combined with one another in an agate mortar in a glovebox filled with dry $N_2$. The crude substance mixture obtained in this way is transferred into an $Al_2O_3$ boat lined with Mo foil. The mixture is heated at 1200-1600° C. for 8 hours under an $N_2/H_2/NH_3$ atmosphere.

Example 4

Preparation of 5 g of $Sr_{5.82}Th_{0.06}Eu_{0.06}Si_3O_6N_4$ 6.6444 g of $SrC_2O_4$ (Alfa Aesar, 95%), 0.0686 g of $Eu_2O_3$ (Treibacher, 99.99%), 0.1030 g of $ThO_2$ (Merck, 99%) and 0.9119 g of $\alpha\text{-}Si_3N_4$ (UBE, 99%) are thoroughly combined with one another in an agate mortar in a glovebox filled with dry $N_2$. The crude substance mixture obtained in this way is transferred into an $Al_2O_3$ boat lined with Mo foil. The mixture is heated at 1200-1600° C. for 8 hours under an $N_2/H_2/NH_3$ atmosphere.

Example 5

Preparation of 5 g of $Sr_{5.82}Os_{0.06}Eu_{0.06}Si_3O_6N_4$ 6.6658 g of $SrC_2O_4$ (Alfa Aesar, 95%), 0.0688 g of $Eu_2O_3$ (Treibacher, 99.99%), 0.0869 g of $OsO_2$ (Alfa Aesar, Os 83% min) and 0.9148 g of $\alpha\text{-}Si_3N_4$ (UBE, 99%) are thoroughly combined with one another in an agate mortar in a glovebox filled with dry $N_2$. The crude substance mixture obtained in this way is transferred into an $Al_2O_3$ boat lined with Mo foil. The mixture is heated at 1200-1600° C. for 8 hours under an $N_2/H_2/NH_3$ atmosphere.

Example 6

Preparation of 5 g of $Sr_{5.82}Ru_{0.06}Eu_{0.06}Si_3O_6N_4$ 6.7129 g of $SrC_2O_4$ (Alfa Aesar, 95%), 0.0693 g of $Eu_2O_3$ (Treibacher, 99.99%), 0.0524 g of $RuO_2$ (Alfa Aesar, 99.9%) and 0.9213 g of $\alpha$-$Si_3N_4$ (UBE, 99%) are thoroughly combined with one another in an agate mortar in a glovebox filled with dry $N_2$. The crude substance mixture obtained in this way is transferred into an $Al_2O_3$ boat lined with Mo foil. The mixture is heated at 1200-1600° C. for 8 hours under an $N_2/H_2/NH_3$ atmosphere.

Example 7

High-Pressure Sintering of the Phosphors from Examples 1-6

In each case, 5 g of the compounds from Examples 1-6 are introduced into an MO crucible and transferred into a high-pressure sintering oven. The samples are heated therein to a temperature of 1400-1600° C. at a nitrogen pressure of 40-70 bar and a heating ramp of 5-10 K/min. The hold time is 6-10 hours.

Example 8

Hot Isostatic Pressing of the Phosphors from Examples 1-6

In each case, 5 g of the compounds from Examples 1-6 are transferred into an isostatic hot press. The hot press is placed under vacuum, and the temperature is raised to 200° C. The temperature is subsequently raised to 1400-1600° C. at 5-10 K/min, and at the same time the pressure is adjusted to values between 50 and 200 MPa. The hold time is 6-10 hours.

Example 9

Washing of the Phosphors from Examples 1-8

In each case, 5 g of the compounds from Examples 1-8 are suspended in 100 ml of 1 molar hydrochloric acid and stirred at room temperature for 3 hours. The residue is subsequently filtered off with suction and washed with deionised water until neutral. The washed residue is then suspended in 100 ml of a 1 molar KOH solution and stirred for a further 30 minutes. The residue is subsequently filtered off with suction and again washed with deionised water until neutral.

TABLE 1

Optical properties of $Sr_{5.94}Eu_{0.06}Si_3O_6N_4$:Eu (as reference) and co-doped phosphors according to the invention

| Composition | Emission max. [nm] | CIE 1931 x, y |
|---|---|---|
| $Sr_{5.94}Eu_{0.06}Si_3O_6N_4$ | 624 | 0.623 0.376 |
| $Sr_{5.94}Eu_{0.06}Si_3O_{5.88}N_4F_{0.24}$ | 623 | 0.622 0.377 |
| $Sr_{5.94}Eu_{0.06}Si_3O_{5.88}N_4Cl_{0.24}$ | 625 | 0.625 0.374 |
| $Sr_{5.94}Ru_{0.06}Eu_{0.06}Si_3O_6N_4$ | 624 | 0.623 0.376 |

TABLE 1-continued

Optical properties of $Sr_{5.94}Eu_{0.06}Si_3O_6N_4$:Eu (as reference) and co-doped phosphors according to the invention

| Composition | Emission max. [nm] | CIE 1931 x, y |
|---|---|---|
| $Sr_{5.94}Th_{0.06}Eu_{0.06}Si_3O_6N_4$ | 625 | 0.621 0.378 |

DESCRIPTION OF THE FIGURES

The invention will be explained in greater detail below with reference to a number of working examples. The figures show the following:

Figure 1:
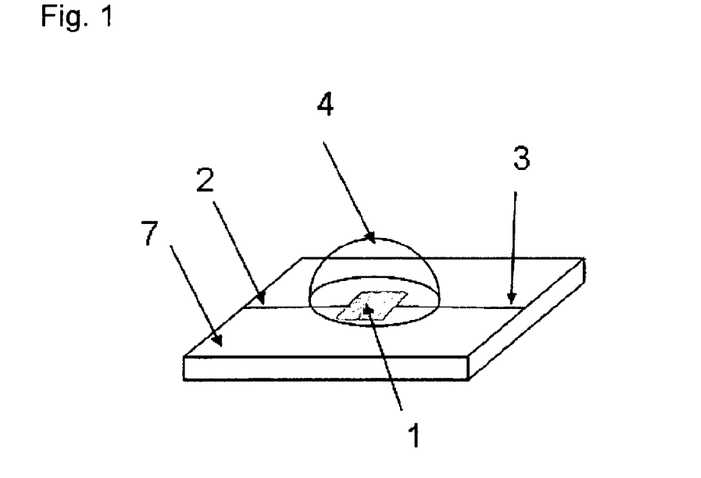

FIG. 1: shows a COB (chip on board) package of the InGaN type, which serves as light source (LED) for white light (1=semiconductor chip; 2,3=electr. connections; 4=conversion phosphor; 7=board). The phosphor is distributed in a binder lens, which at the same time represents a secondary optical element and influences the light emission characteristics as a lens.

Figure 2:
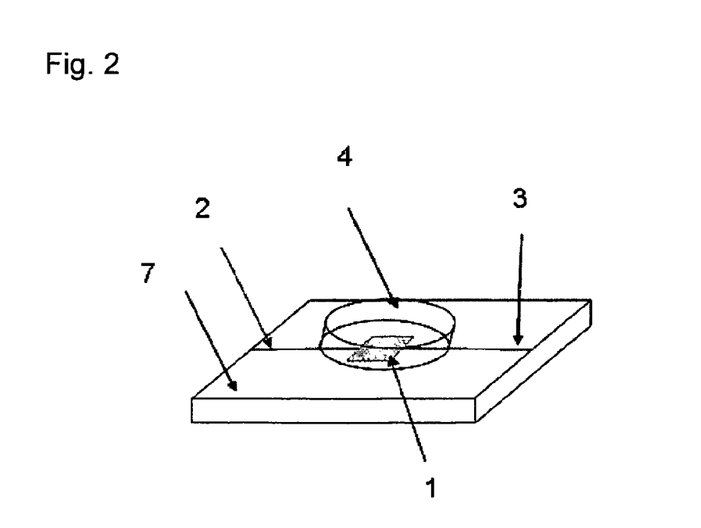

FIG. 2: shows a COB (chip on board) package of the InGaN type, which serves as light source (LED) for white light (1=semiconductor chip; 2,3=electr. connections; 4=conversion phosphor; 7=board) The phosphor is located directly on the LED chip distributed in a thin binder layer. A secondary optical element consisting of a transparent material can be placed thereon.

Figure 3:
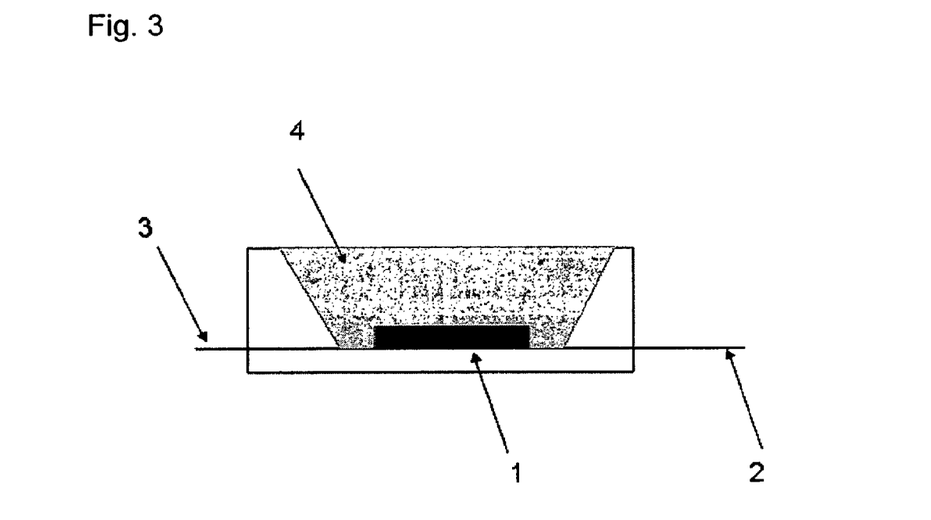

FIG. 3: shows a Golden Dragon® package, which serves as light source (LED) for white light (1=semiconductor chip; 2,3=electr. connections; 4=conversion phosphor in cavity with reflector). The conversion phosphor is dispersed in a binder, with the mixture filling the cavity.

Figure 4:
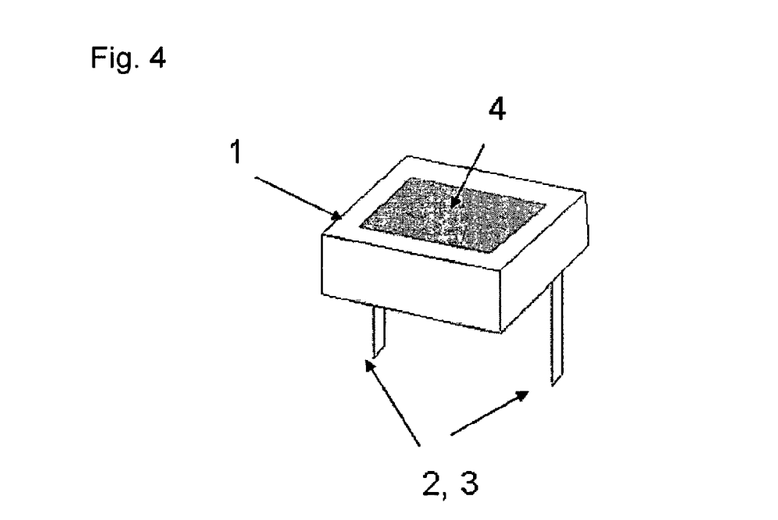

FIG. 4: shows an SMD package (surface mounted package) where 1=housing; 2, 3=electr. connections, 4=conversion layer. The semiconductor chip is completely covered by the phosphor according to the invention. The SMD design has the advantage that it has a small design and thus fits in conventional lights.

Figure 5:
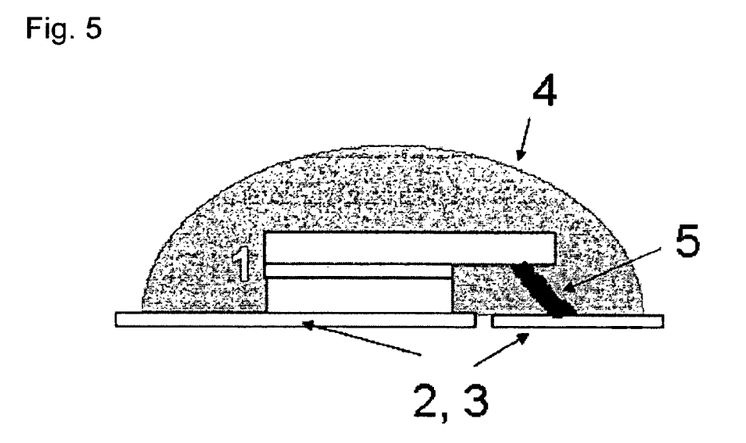

FIG. 5: shows a diagrammatic representation of a light-emitting diode where 1=semiconductor chip; 2, 3=electr. connections; 4=conversion phosphor, 5=bond wire, where the phosphor is applied as top globe in a binder. This form of the phosphor/binder layer can act as secondary optical element and influence, for example, the light propagation.

Figure 6:
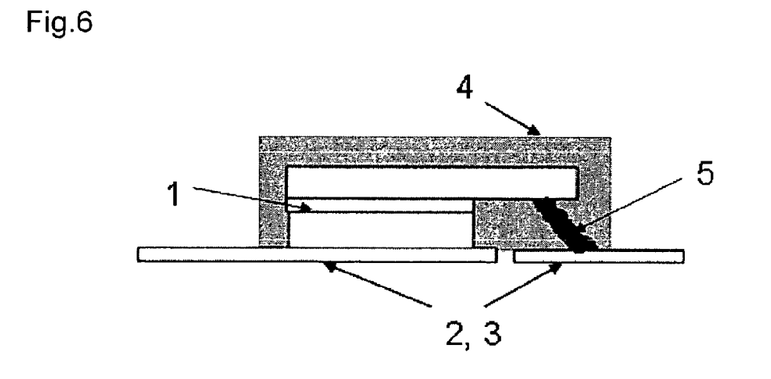

FIG. 6: shows a diagrammatic representation of a light-emitting diode where 1=semiconductor chip; 2, 3=electr. connections; 4=conversion phosphor; 5=bond wire, where the phosphor is applied as a thin layer dispersed in a binder. A further component acting as secondary optical element, such as, for example, a lens, can easily be applied to this layer.

Figure 7:
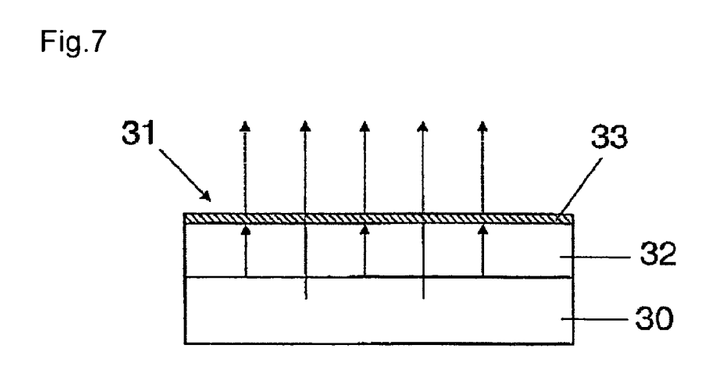

FIG. 7: shows an example of a further application, as is already known in principle from U.S. Pat. No. 6,700,322. The phosphor according to the invention is used here together with an OLED. The light source is an organically light-emitting diode 31, consisting of the actual organic film 30 and a transparent substrate 32. The film 30 emits, in particular, blue primary light, generated, for example, by means of PVK: PBD:coumarine (PVK, abbreviation for poly(n-vinylcarbazole); PBD, abbreviation for 2-(4-biphenyl)-5-(4-tert-butylphenyl)-1,3,4-oxadiazole). The emission is partially converted into yellow, secondarily emitted light by a top layer formed from a layer 33 of the phosphor according to the invention, resulting overall in white emission through colour mixing of the primarily and secondarily emitted light. The OLED essentially consists of at least one layer of a light-emitting polymer or of so-called small molecules between two electrodes consisting of materials known per se, such as, for example, ITO (abbreviation for indium tin oxide), as anode and a highly reactive metal, such as, for example, Ba or Ca, as cathode. A plurality of layers are often also used between the electrodes, which serve either as hole-transport layer or, in the area of small molecules, also as electron-transport layers. The emitting polymers used are, for example, polyfluorenes or polyspiro materials.

The invention claimed is:

1. A 6-3-6-4 alkaline-earth metal silicooxynitride compound with europium doping which additionally comprises co-dopants selected from Th, Ru, Os, F and Cl.

2. The compound according to claim 1, wherein said compound is of formula I $$(Ca,Sr,Ba)_{6-x}(Si_{1-y}Me_y)_3(O_{1-z}Ma_{2z})_6N_4:Eu_x \qquad (I)$$

where
Me is Th, Ru and/or Os,
Ma is F and/or Cl,
x is <0.5,
y is <1, and
z<0.1.

3. The compound according to claim 1, wherein x is 0.003 to 0.2, y is 0.0001 to 0.2 and z is 0.0005 to 0.03.

4. The compound according to claim 1, wherein x is 0.005 to 0.15 and/or y is 0.001 to 0.02.

5. The compound according to claim 1, obtained by:
mixing silicon nitride-, europium- and calcium- and/or strontium- and/or barium-containing starting materials with at least one thorium-, osmium-, ruthenium-, fluoride- and/or chloride-containing co-dopant by solid-state diffusion methods, and
subsequently subjecting the resultant mixture to thermal aftertreatment to form said 6-3-6-4 alkaline-earth metal silicooxynitride compound.

6. A process for the preparation of a compound according to claim 1, said process comprising:
a) preparing a europium-doped 6-3-6-4 alkaline-earth metal silicooxynitride compound which is co-doped with thorium-, ruthenium-, osmium-, fluoride- and/or chloride-containing materials, by mixing:
at least 4 starting materials selected from silicon nitride-, europium-, calcium-, strontium-, barium-, thorium-, ruthenium-, osmium-, fluoride- and/or chloride-containing materials, and
subjecting the resultant mixture to a thermal aftertreatment to form a europium-doped 6-3-6-4 alkaline-earth metal silicooxynitride compound which is co-doped with thorium-, ruthenium-, osmium-, fluoride- and/or chloride-; and
b) washing the resultant thermally aftertreated compound with an HCl solution and a KOH solution.

7. A shaped body comprising a compound according to claim 1, wherein said shaped body has a rough surface which carries nanoparticles comprising $SiO_2$, $TiO_2$, $Al_2O_3$, ZnO, $ZrO_2$ and/or $Y_2O_3$ or mixed oxides thereof and/or particles comprising said compound, with dopants from the series europium, thorium, ruthenium, osmium, fluorine and/or chlorine.

8. A shaped body comprising a compound according to claim 1, wherein said shaped body has a continuous surface coating consisting of $SiO_2$, $TiO_2$, $Al_2O_3$, ZnO, $ZrO_2$ and/or $Y_2O_3$ or mixed oxides thereof and/or of said compound without the activator europium.

9. A shaped body comprising a compound according to claim 1, wherein said shaped body has a porous surface coating consisting of $SiO_2$, $TiO_2$, $Al_2O_3$, ZnO, $ZrO_2$ and/or $Y_2O_3$ or mixed oxides thereof and/or of said compound with dopants from the series europium, thorium, ruthenium, osmium, fluorine and/or chlorine.

10. A shaped body comprising a compound according to claim 1, wherein the surface of said shaped body carries functional groups which facilitate chemical bonding or physical binding to the environment.

11. A process for production of a shaped body according to claim 8, said process comprising:
a) preparing a europium-doped 6-3-6-4 alkaline-earth metal silicooxynitride compound which is co-doped with thorium-, ruthenium-, osmium-, fluoride- and/or chloride-containing materials, by:
mixing at least 4 starting materials selected from silicon nitride-, europium-, calcium-, strontium-, barium-, thorium-, ruthenium-, osmium-, fluorine- and/or chlorine-containing materials, and
subjecting the resultant mixture to a thermal aftertreatment;
b) shaping a body from the resultant aftertreated material; and
c) coating the surface of the body with nanoparticles comprising $SiO_2$, $TiO_2$, $Al_2O_3$, ZnO, $ZrO_2$ and/or $Y_2O_3$ or mixed oxides thereof, or with nanoparticles comprising the europium-doped 6-3-6-4 alkaline-earth metal silicooxynitride compound, with or without dopants.

12. The process according to claim 11, wherein said aftertreatment is followed by washing with an HCl solution and a KOH solution.

13. A lighting unit comprising at least one primary light source whose emission maximum is in the range 250 nm to 530 nm, where this radiation is partially or fully converted into longer-wavelength radiation by a compound according to claim 1.

14. The lighting unit according to claim 13, wherein said primary light source is a luminescent indium aluminium gallium nitride.

15. The lighting unit according to claim 13, wherein said primary light source is a luminescent compound based on ZnO, TCO (transparent conducting oxide), ZnSe or SiC.

16. The lighting unit according to claim 13, wherein said primary light source is a material based on an organic light-emitting layer.

17. The lighting unit according to claim 13, wherein said primary light source is a plasma or discharge lamp.

18. The lighting unit according to claim 13, wherein said compound is arranged directly on the primary light source.

19. The lighting unit according to claim 13, wherein optical coupling between said compound and the primary light source is achieved by a light-conducting arrangement.

20. A method of generating luminescence comprising exciting a compound according to claim 1 with light.

21. A method for the partial or complete conversion of the blue or near-UV emission from a luminescent diode comprising coupling said to a compound of claim 1.

22. A method for conversion of primary radiation into a certain color point, in accordance with the color-on-demand concept, comprising coupling said primary radiation to a compound of claim 1.

23. A shaped body comprising a compound according to claim 1, wherein said shaped body has a rough surface which carries nanoparticles comprising $SiO_2$, $TiO_2$, $Al_2O_3$, ZnO, $ZrO_2$ and/or $Y_2O_3$ or mixed oxides thereof and/or particles comprising said compound, without dopants from the series europium, thorium, ruthenium, osmium, fluorine and/or chlorine.

24. A shaped body comprising a compound according to claim 1, wherein said shaped body has a porous surface coating consisting of $SiO_2$, $TiO_2$, $Al_2O_3$, ZnO, $ZrO_2$ and/or $Y_2O_3$ or mixed oxides thereof and/or of said compound without dopants from the series europium, thorium, ruthenium, osmium, fluorine and/or chlorine.

25. A lighting unit according to claim 13, wherein said at least one primary light source has an emission maximum in the range 350 nm to 500 nm.

26. The lighting unit according to claim 14, wherein said luminescent indium aluminium gallium nitride is of the formula $In_iGa_jAl_kN$, where $0 \leq i$, $0 \leq j$, $0 \leq k$, and $i+j+k=1$.

27. The lighting unit according to claim 18, wherein said compound is arranged remotely from the primary light source.

* * * * *